W. S. BLAISDELL & E. EASTABROOK.
Coffee-Pots.

No. 142,195.  Patented August 26, 1873.

Witnesses.
E. W. Bates.
George E. Upham,

Inventors.
William S. Blaisdell
Emerson Estabrook
Chipman Formester
Attys

UNITED STATES PATENT OFFICE.

WILLIAM S. BLAISDELL AND EMERSON ESTABROOK, OF FACTORY POINT, VERMONT.

IMPROVEMENT IN COFFEE-POTS.

Specification forming part of Letters Patent No. 142,195, dated August 26, 1873; application filed June 14, 1873.

*To all whom it may concern:*

Be it known that we, WILLIAM S. BLAISDELL and EMERSON ESTABROOK, of Factory Point, in the county of Bennington and State of Vermont, have invented a new and valuable Improvement in Steepers and Drenchers; and we do hereby declare that the following is a full, clear, and exact description of the construction and operation of the same, reference being had to the annexed drawings making a part of this specification, and to the letters and figures of reference marked thereon.

Figure 1:
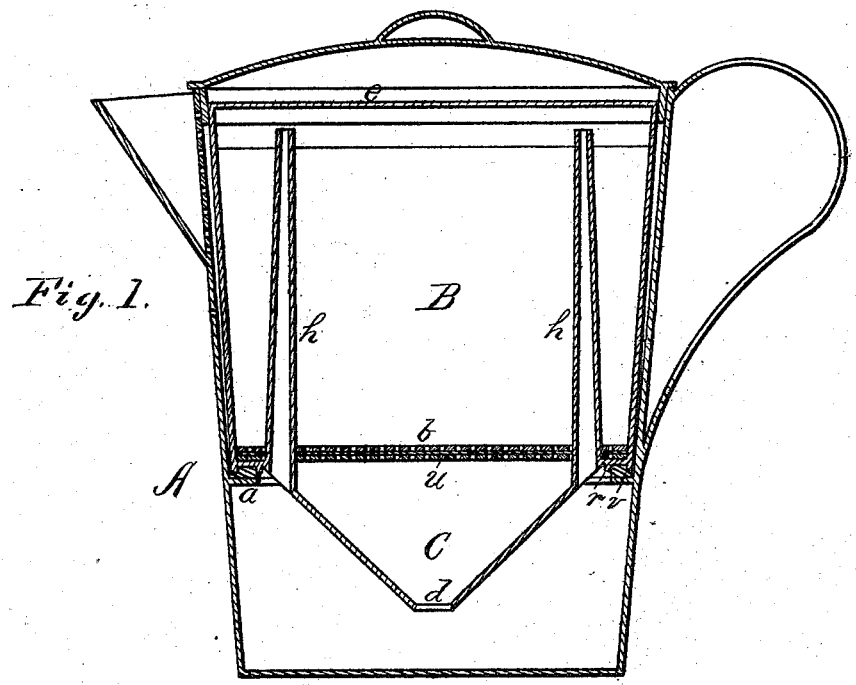
Figure 2:
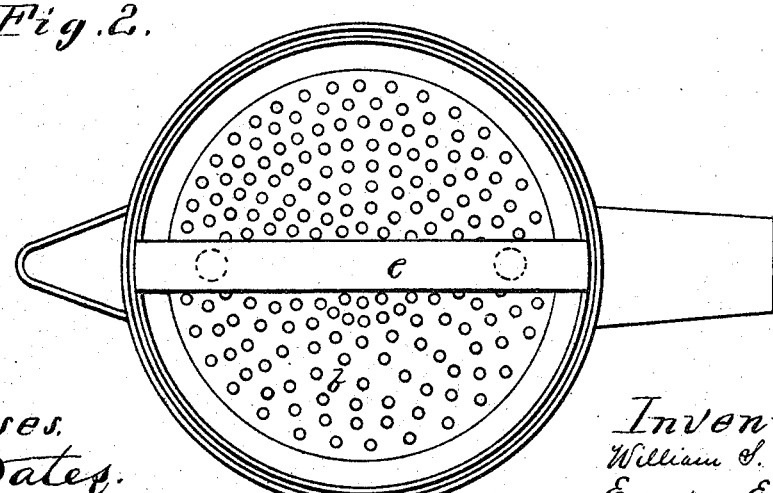

Figure 1 of the drawings is a representation of a sectional view of our steeper and drencher. Fig. 2 is a plan view of the same.

This invention has relation to a steeper or drencher for coffee, tea, herbs, and other articles of like nature; and it consists in the construction and novel arrangement of the perforated base, dividing the herb-chamber from the suction-chamber below, in the form of an inverted cone open at the apex, and the cone-like tubes rising from the upper portion or widest part of said inverted cone through the perforated base to the upper part of the herb-chamber, across the top of which extends a deflecting-plate, which serves also as a handle.

In the accompanying drawings, the letter A designates an ordinary coffee-pot, having an internal annular flange, $a$, somewhat above its bottom, and serving to support the steeper. This consists of an upper chamber or cup, B, having a perforated bottom, $b$, and underneath the latter a depending chamber, C, in the form of an inverted cone, having an opening, $d$, at its lowest portion or apex, which is designed to be supported somewhat above the bottom of the coffee-pot. Across the top of the cup B is extended a horizontal plate, $e$, which may serve, at times, as a handle for manipulating the steeper. Below this plate rise from the upper portion or base of the inverted cone C two or more conical hollow spouts, $h$, through the perforated base $b$ of the herb-chamber. The upper ends of these spouts are located under the plate $e$, and at a little distance therefrom, so that said plate will serve as a deflector and spreader for the fluid forced upward through the spouts by the steam formed below. The conical chamber C, extending downward into the fluid in the bottom of the coffee-pot, accelerates the draft of the fluid through the perforated bottom. It also serves to convey the liquid which has passed through the herbs or ground coffee to the center of the lowest portion of the pot, whence it rises in the chamber around the cone through the spouts. In this manner the passage of every particle of fluid through the substance in the herb-chamber is insured as many times as may be desirable.

In Fig. 1 of the drawings double perforated plates are shown, between which is arranged a sheet, $u$, of woven stuff or flannel, which serves to keep the more minute impurities in the cup B. The obstruction to the passage of the liquid presented is more than compensated for by the powerful suction created. Between the lower outer edge of the cup B and the upper edge of the cone-chamber C a channel, $r$, is made in the base of said cup, entirely around it, for the reception of the packing-ring $v$, which is designed to rest on the ledge $a$, forming a tight joint.

What I claim as new, and desire to secure by Letters Patent, is—

1. In a steeper and drencher, the steeping-cup B, suction-chamber C, perforated plates, spouts $h$, flannel disk $u$, ledge $a$, and packing-ring $v$, arranged and operating substantially as specified.

2. The steeper consisting of the herb-chamber B, having a perforated bottom, $b$, a depending suction-chamber, C, in the form of an inverted cone open at the apex, the side spouts $h$ rising from the upper portion or base of said cone into the chamber, and the deflecting-plate $e$ extending across said chamber over said spouts, substantially as specified.

In testimony that we claim the above we have hereunto subscribed our names in the presence of two witnesses.

WILLIAM S. BLAISDELL.
   EMERSON ESTABROOK.

Witnesses:
 VESTER M. HOWARD,
 RANNY HOWARD.